(No Model.)
G. W. COLLINS.
DEVICE FOR LOADING SHOCKS OF CORN.
No. 518,487. Patented Apr. 17, 1894.
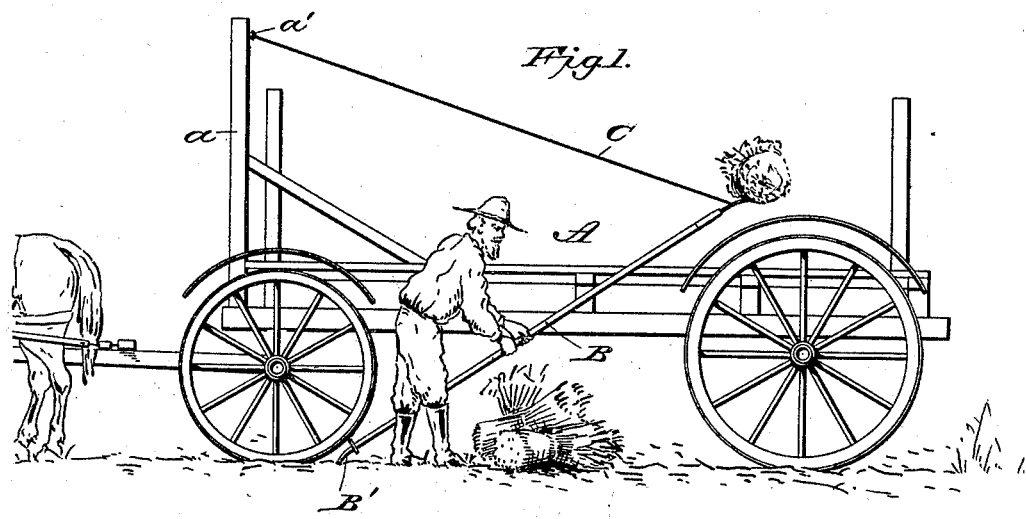
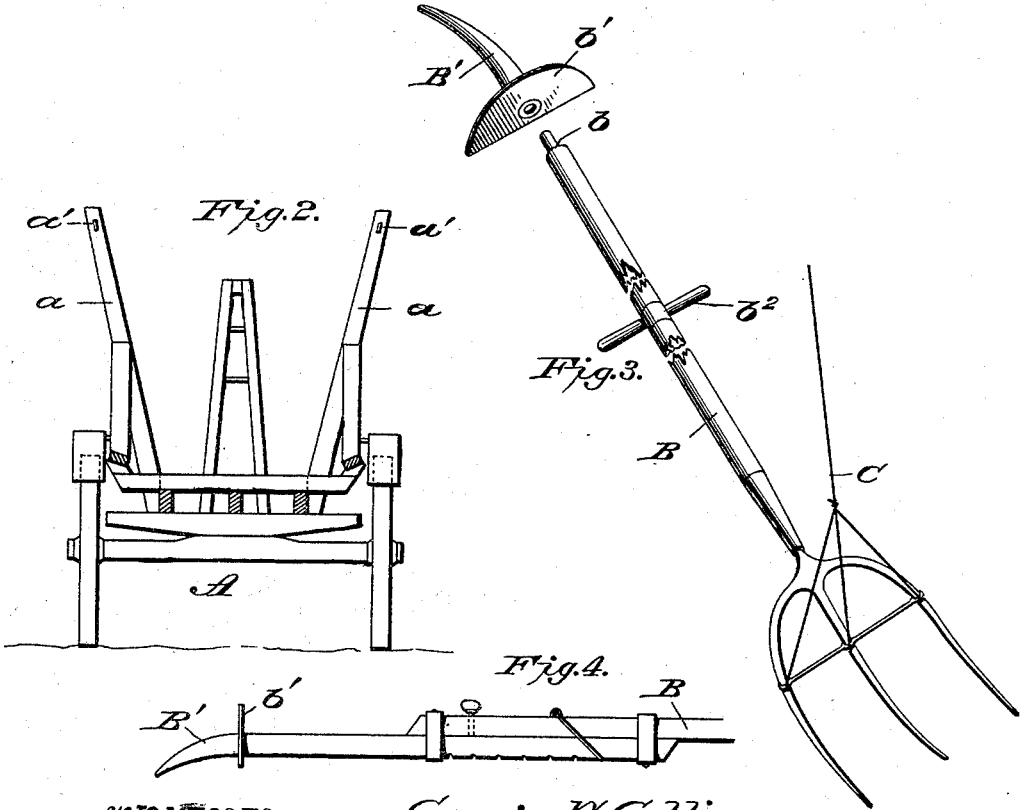
WITNESSES
G. S. Elliott
E. W. Johnson
George W. Collins, INVENTOR
Attorney
THE NATIONAL LITHOGRAPHING COMPANY,
WASHINGTON, D. C.

UNITED STATES PATENT OFFICE.

GEORGE W. COLLINS, OF WEST LEBANON, PENNSYLVANIA.

DEVICE FOR LOADING SHOCKS OF CORN.

SPECIFICATION forming part of Letters Patent No. 518,487, dated April 17, 1894.

Application filed December 28, 1893. Serial No. 494,957. (No model.)

*To all whom it may concern:*

Be it known that I, GEORGE W. COLLINS, a citizen of the United States of America, residing at West Lebanon, in the county of Indiana and State of Pennsylvania, have invented certain new and useful Improvements in Devices for Loading Corn-Shocks or Sheaves of Grain on Wagons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in devices for loading hay, corn shocks, or sheaves of grain on wagons.

In the accompanying drawings, which illustrate my invention, Figure 1 is a side elevation showing the application of my improvement to a wagon. Fig. 2 is a rear elevation, partly in section, showing the front end of the wagon with uprights to which is secured the flexible connection attached to the fork. Fig. 3 is a perspective view of the fork, and Fig. 4 is a detail view of a modification of the fork handle.

A designates a wagon which is provided with suitably braced uprights $a$ $a$ to the upper ends of which are secured hooks or eyes $a'$. The uprights diverge from the wagon body so that their upper ends will be on a vertical line with or beyond the sides of the body.

B designates a fork, the handle of which at its end opposite the tines being reduced to provide a shoulder $b$ and projecting pin which enters a socket formed in an attachment B'. This attachment has a shield $b'$ which is semi-circular as shown, and beyond this shield projects a spur which is preferably curved so that it will more readily enter the ground. At a suitable point the handle of the fork is provided with a cross-bar $b^2$ which forms a convenient grasp for turning the fork to dislodge the hay shock or sheaf therefrom. Either to the handle or to the tines of the fork is attached a flexible connection C, the other end of which is attached to the eye or hook at the upper end of one of the uprights $a$ of the wagon.

When a fork of ordinary construction is used I prefer to provide the tines with a cross-bar and attach short connections thereto adjacent to the tines, said short connections extending to a common point of juncture where they are attached to the connection C.

In Fig. 4 I have shown the handle of the fork made up of two sections which are adjustably connected to each other so that the handle can be lengthened as the wagon is loaded.

In operation, when it is desired to load a wagon with hay, corn-shocks, or sheaves of grain the flexible connection C is attached to one of the uprights $a$ of the wagon and to the fork; and then as the wagon is being drawn across the field the attendant causes the tines of the fork to engage with a sheaf, corn shock, or cock of hay, and forces the end of the handle into the ground, the forward motion of the wagon drawing upon the connection C and elevating the sheaf or shock so that it can be deposited in the wagon. When the soil is soft the attachment B' is used, as the shield will prevent the handle entering the soil too deeply.

Having thus described my invention, what I claim as new, and desire to secure by Letters Patent, is—

1. In combination with a fork for loading wagons with shocks, sheaves or hay, an attachment for the end of the fork comprising a curved point and a shield, and means for connecting said attachment to the fork, substantially as shown.

2. The combination, with a wagon having an upright $a$ and a flexible connection adapted to be attached thereto and to the fork, of a hand fork having a handle with a pointed end and a shield adjacent to said pointed end, the tines of the fork having a cross-bar with which the flexible connection engages, substantially as shown.

In testimony whereof I affix my signature in presence of two witnesses.

GEORGE W. COLLINS.

Witnesses:
NANNIE MCGAUGH,
NANNIE CALHOUN.